H. M. HULL.
CHAIN FOR VEHICLE TIRES.
APPLICATION FILED OCT. 23, 1920.
1,391,254.                                    Patented Sept. 20, 1921.
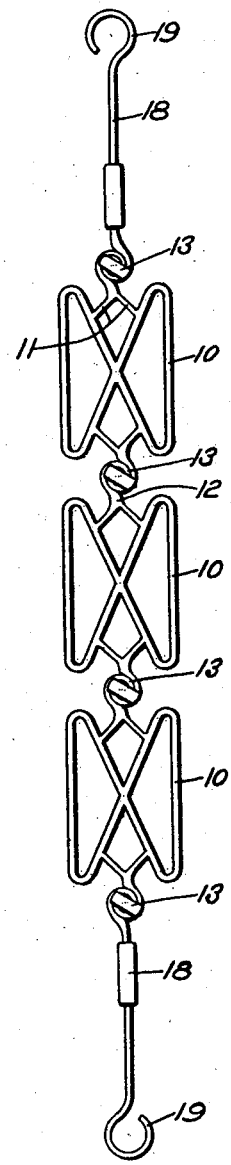
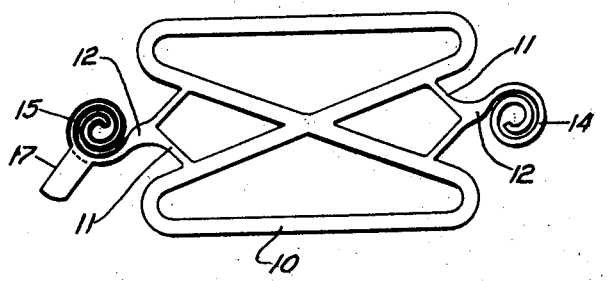
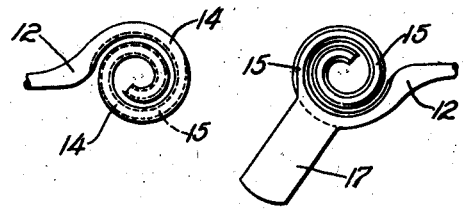
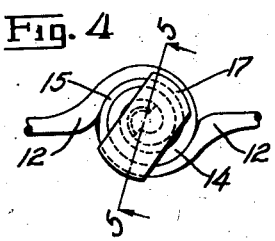
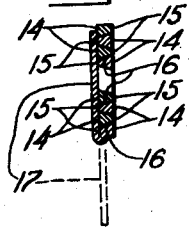
INVENTOR
Henry M. Hull.
BY
G. H. Braddock
ATTORNEY

UNITED STATES PATENT OFFICE.

HENRY M. HULL, OF FAIRFIELD, CONNECTICUT.

CHAIN FOR VEHICLE-TIRES.

1,391,254.  Specification of Letters Patent.  Patented Sept. 20, 1921.

Application filed October 23, 1920. Serial No. 418,927.

*To all whom it may concern:*

Be it known that HENRY M. HULL, a citizen of the United States, and resident of Fairfield, in the county of Fairfield and State of Connecticut, has invented certain new and useful Improvements in Chains for Vehicle-Tires, of which the following is a specification.

This invention relates to chains of the type adapted to be arranged in any ordinary or preferred manner on vehicle tires to serve as grip treads therefor.

An important object of the invention is to produce a chain of the character mentioned composed of duplicate links, or other non-slip devices, each equipped with complementary joint members for the purpose of detachably connecting the links with each other to provide a chain of any desired length. A further important object is to produce a chain the links of which can be readily replaced when broken, to obviate the necessity of discarding an entire chain when a single link thereof has become broken or otherwise unfit, as has heretofore generally been the case. A still further important object is to provide novelly constructed joint members and so arrange them on the links that the joints between connected links will be as durable as the links themselves.

With the above and other objects in view, the construction, arrangement and combination of parts constituting the chain of the invention will now be fully described and will hereinafter be specifically claimed.

In the accompanying drawing forming a part of this specification,

Figure 1 is a plan view of a chain made in accordance with the principles of the invention, and disclosing the face of the chain which is adapted to rest against the tread of a tire;

Fig. 2 is a plan view on an enlarged scale of one of the links, together with its complementary joint members;

Fig. 3 is a detail view disclosing the joint members of Fig. 2;

Fig. 4 is a view of the joint members as when locked together to provide a joint; and Fig. 5 is a sectional view on line 5—5 in Fig. 4, looking in the direction of the arrows.

While I have preferred to show the individual links of the chain as each consisting of a main body portion 10, of the general configuration of the figure 8, to the side edges of which are secured angular pieces 11, the links may have any ordinary or preferred configuration which will render them capable of resting against the tread of a tire when the chain is applied. Extending in opposite directions from each link are shanks 12 which merge into joint members for the links presently to be fully described. The shanks may be integral with the links, as shown, or they may be secured to the links in any desired manner to allow slight sidewise movements of the links and shanks with respect to each other.

As will be understood from Fig. 2, each link is provided with complementary joint members which are preferably integrally carried by the shanks hereinbefore mentioned, and corresponding joint members of individual links are identical. That is, the joint member at the left in Fig. 2 is identical with the corresponding joint member of a duplicate link, and is adapted to engage the joint member of said duplicate link which is identical with the joint member at the right in said figure to provide the joints designated generally by numeral 13 in Fig. 1.

The joint members are, as shown, preferably of spiral configuration, and curve in opposite directions from their shanks. Each of the spiral joint members has a relatively broad face 14 and a relatively narrow face 15, to provide beveled walls 16 between the faces, and the spirals are constructed and arranged to interlock so that the beveled walls engage each other, when the broad and narrow faces, respectively, are flush with each other. In other words, the narrow faces of complementary spirals are adapted to move into each other until the beveled walls of the joint members firmly engage each other, and said spirals and their beveled walls are so constructed and arranged that when the beveled walls of complementary joint members are in engagement, the relatively broad and narrow faces, respectively, of the spirals are flush with each other. See Fig. 5. 17 denotes a locking strip preferably integrally carried by one of the joint members and adapted to be bent down against the narrow face of the joint member by which carried and against the broad face of the other joint member to insure the interlocking engagement of the joint members, as will be understood without further description. It is to be remarked that the joint members can be made of various configurations without departing from the spirit of the invention, the broad idea being to provide complementary joint members adapted to interlock to provide joints which will effectually hold the links to each other so long as the joint members have any appreciable thickness, or until the links themselves are worn completely through, it being obvious that one of the faces of the joint shown in Fig. 5, the one to the right in said figure, can become almost completely worn away without causing the joint members to become unfit for their purpose.

The shanks and their joint members can be of the thickness of the links, or other non-skid devices, or can be of less thickness. In either event, the faces of the joint members against which the locking strips are bent are adapted to be located adjacent the tread of the tire, and the locking strips are adapted to rest against the tread when the chain is in position on the tire.

Referring to Fig. 1, 18 denotes a pair of shanks having hooks 19 by means of which the chain can be secured upon a tire. The opposite ends of the shanks are provided with joint members corresponding with the complementary joint members of the links, respectively.

What I desire to claim is:

1. A chain of the character described, consisting of a plurality of links each having complementary joint members, and a locking strip for positively holding said joint members to each other.

2. A chain of the character described, non-skid devices each provided with complementary joint members adapted to interlock with each other, and bendable means for said joint members for insuring their interlocking relation.

3. A chain of the character described, consisting of a plurality of links provided with complementary joint members each having an upper and a lower face and walls extending the full distance between the faces, complementary joint members of different links adapted to interlock in such manner that said walls engage each other and said upper and lower faces, respectively, are flush with each other.

4. A chain of the character described, consisting of a plurality of links provided with complementary joint members each having an upper and a lower face and beveled walls between the faces, complementary joint members of different links adapted to interengage throughout their entire thicknesses and so that said upper and lower faces, respectively, are flush with each other throughout their entire areas, whereby said links will be held to each other until said joint members are completely worn away.

5. In a chain of the character described, complementary joint members, said members provided with beveled walls and with flat upper and lower faces between which said beveled walls extend, said walls adapted to engage each other so that said faces, respectively, are flush with each other, and means for holding said joint members to each other.

6. A chain for the purpose specified and consisting of a plurality of links, each link provided with complementary joint members, complementary joint members of different links adapted to interlock, all of said joint members being of spiral configuration and provided with flat faces and with beveled walls, said beveled walls adapted to engage each other and said flat faces adapted to lie flush with each other, and locking strips carried by half of said joint members and adapted to hold complementary joint members so that their beveled walls cannot be removed from each other.

7. A chain adapted to grip the tread of a tire and consisting of links, each link provided with complementary joint members, complementary joint members of different links adapted to engage each other, all of said joint members being of spiral configuration and provided with flat relatively broad faces and with flat relatively narrow faces and having beveled walls extending between the faces, said broad and narrow faces, respectively, adapted to lie flush with each other when said beveled walls bear against each other, and means carried by one of each set of complementary joint members for holding the joint members to each other.

Signed at Bridgeport in the County of Fairfield, and State of Connecticut, this 21 day of October, A. D. 1920.

HENRY M. HULL.